United States Patent [19]
Lubowitz et al.

[11] Patent Number: 5,654,396
[45] Date of Patent: Aug. 5, 1997

[54] POLYIMIDE OLIGOMERS

[75] Inventors: Hyman R. Lubowitz, Rolling Hills Estates, Calif.; Clyde H. Sheppard, Post Falls, Id.

[73] Assignee: The Boeing Company, Seattle, Wash.

[21] Appl. No.: 464,427

[22] Filed: Jun. 5, 1995

Related U.S. Application Data

[63] Continuation-in-part of Ser. No. 327,942, Oct. 21, 1994, and Ser. No. 159,823, Nov. 30, 1993, Pat. No. 5,455,115, which is a division of Ser. No. 886,960, May 21, 1992, Pat. No. 5,286,811, which is a division of Ser. No. 353,588, May 18, 1989, Pat. No. 5,116,935, which is a continuation-in-part of Ser. No. 46,376, May 4, 1987, abandoned, which is a continuation-in-part of Ser. No. 715,801, Mar. 22, 1985, abandoned, which is a continuation-in-part of Ser. No. 536,264, Sep. 27, 1983, abandoned.

[51] Int. Cl.$^6$ .................... C08G 73/10; C08G 69/26
[52] U.S. Cl. .................. 528/353; 528/170; 528/171; 528/172; 528/173; 528/176; 528/185; 528/188; 528/220; 528/229; 528/350; 428/411.1; 525/421; 525/422; 525/426; 525/432; 525/436

[58] Field of Search ................... 525/432, 436, 525/421, 422, 426; 528/170, 171, 172, 174, 173, 176, 185, 188, 322, 220, 229, 350, 353; 428/411.1

[56] References Cited

U.S. PATENT DOCUMENTS

| | | | |
|---|---|---|---|
| 5,116,935 | 5/1992 | Lubowitz et al. | 525/436 |
| 5,144,000 | 9/1992 | Sheppard et al. | 528/170 |
| 5,216,117 | 6/1993 | Sheppard et al. | 528/173 |
| 5,344,894 | 9/1994 | Lubowitz et al. | 525/436 |

*Primary Examiner*—James J. Seidleck
*Assistant Examiner*—P. Hampton-Hightower
*Attorney, Agent, or Firm*—John C. Hammar

[57] ABSTRACT

We achieve solvent resistance and extended use life for advanced polyimides by including at least some solvent-resistant linkages in the backbone in place of phenoxyphenyl sulfone linkages and using diPEPA or PEPA crosslinking end caps.

20 Claims, No Drawings

POLYIMIDE OLIGOMERS

REFERENCE TO RELATED APPLICATIONS

This application is a continuation-in-part application based upon U.S. patent application Ser. No. 08/159,823, filed Nov. 30, 1993 now U.S. Pat. No. 5,455,115; which was a divisional application based upon U.S. patent application Ser. No. 07/886,960, filed May 21, 1992, now U.S. Pat. No. 5,286,811; which was a divisional application of U.S. patent application Ser. No. 07/353,588, filed May 18, 1989, now U.S. Pat. No. 5,116,935; which was a continuation-in-part application based upon U.S. patent application Ser. No. 07/046,376, filed May 4, 1987 now abandoned; which was a continuation-in-part application based upon U.S. patent application Ser. No. 06/715,801, filed Mar. 22, 1985, now abandoned; which was a continuation-in-part application based upon U.S. patent application Ser. No. 06/536,264, filed Sep. 27, 1983, now abandoned.

This application is also a continuation-in-part application based upon U.S. patent application Ser. No. 08/327,942, filed Oct. 21, 1994.

We incorporate these applications and patents by reference.

TECHNICAL FIELD

The present invention relates to linear and multidimensional polyimide oligomers that include mono- or difunctional crosslinking end cap (terminal) groups, and especially to compositions suitable for use in high speed aircraft. Cured composites of these oligomers display improved toughness, and thermal stability. The oligomers include backbones comprised of alternating residues of diamines and dianhydrides and have two functional capping groups at each chain or arm end.

BACKGROUND ART

Thermosetting resins that are commonly used in fiber-reinforced composites cannot be reshaped after thermoforming. Errors in forming cannot be corrected, so these thermosetting resins are undesirable in many applications.

Although thermoplastic resins are well known, the use of fiber-reinforced thermoplastic resins is a relatively new art. Fiber toughens and stiffens the thermoplastic resin to produce high-performance composite products. A sheet of fiber-reinforced resin can be heated and then stamped into a desired shape with appropriate dies. The shape can be altered thereafter, if desired.

Thermoplastic resins commonly have a tendency to be weakened by organic solvents. Accordingly, circuit boards formed from conventional, fiber-reinforced thermoplastic resin composites usually cannot be cleaned with solvents that are commonly used in the aerospace industry. In structural aircraft applications, care must also be taken to eliminate contact between the composites and hydraulic or cleaning fluids. At moderate or high temperatures, many fiber-reinforced thermoplastic composites lose their abilities to carry load due to softening of the resin. Thus, improved thermal stability and solvent-resistance are desirable to fulfill the existing needs for advanced composites. The oligomers of the present invention provide such polyimide composites when they are cured.

Recently, chemists have sought to synthesize oligomers for high performance advanced composites suitable for aerospace applications. These composites should exhibit solvent resistance, toughness, impact resistance, ease of processing, and strength, and should be thermoplastic. Oligomers and composites that have thermooxidative stability and, accordingly, can be used at elevated temperatures are particularly desirable. They are essential for the fabrication of the next generation supersonic military or commercial transport.

While epoxy-based composites are suitable for many applications, their brittle nature and susceptibility to degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°–625° F., since they have glass transition temperatures of about 690° F. These formulations present manufacturing obstacles for reproducibility and reliability because of prepreg aging and also pose health and safety concerns with carcinogens mixed in the monomer reactants prior to cure.

There has been a progression of polyimide sulfone compounds synthesized to provide unique properties or combinations of properties. For example, Kwiatkowski and Brode synthesized maleic capped linear polyarylimides as disclosed in U.S. Pat. No. 3,839,287. Holub and Evans synthesized maleic or nadic capped imido-substituted polyester compositions as disclosed in U.S. Pat. No. 3,729,446. Monacelli proposed tetra-maleimides made through an amic acid mechanism with subsequent ring closure, as shown in U.S. Pat. Nos. 4,438,280 or 4,418,181. We synthesized thermally stable polysulfone oligomers (U.S. Pat. No. 4,476,184 or U.S. Pat. No. 4,536,559) polyimidesulfones that are fully-imidized yet soluble in conventional processing solvents (U.S. Pat. Nos. 5,001,905 or 5,175,234) polybenzoxazolesulfones, polybutadienesulfones, and "star" or "star-burst" multidimensional oligomers. We have shown surprisingly high glass transition temperatures yet reasonable processing and desirable physical properties in many of these oligomers and their composites.

Polybenzoxazoles (or their corresponding heterocycles), such as those disclosed in our U.S. Pat. Nos. 4,965,336 and 4,868,270 may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in U.S. Pat. No. 5,210,213 or our copending U.S. patent application Ser. Nos. 07/167,656 and 07/176,518, have superior processibility than many other advanced oligomers since they can be processed at lower temperatures. Upon curing, however, the phenylimide end caps crosslink so that the thermal resistance and stiffness of the resulting composite is markedly increased. This increase is in thermomechanical and thermo-oxidative stability obtained with only a minor loss of matrix stress transfer (impact resistance), toughness, elasticity, and other mechanical properties, and can achieve glass transition temperatures above 850° F.

Commercial polyesters, when combined with well-known reactive diluents, such as styrene, exhibits marginal thermal and oxidative resistance, and are useful only for aircraft or aerospace interiors. Polyarylesters are often unsatisfactory, also, since the resins often are semicrystalline which may make them insoluble in usable laminating solvents, intractable in fusion under typical processing conditions, and difficult and expensive to manufacture because of shrinking and/or warping. Those polyarylesters that are soluble in conventional laminating solvents remain so in composite form, thereby limiting their usefulness in structural composites. The high concentration of ester groups contributes to resin Strength and tenacity, but also to make the resin susceptible to the damaging effects of water absorption. High moisture absorption by commercial polyesters can lead to lowering of the glass transition temperature leading to distortion of the composite when it is loaded at elevated temperature.

High performance, aerospace, polyester advanced composites, however, can be prepared using crosslinkable, end-capped polyester imide ether sulfone oligomers that have an acceptable combination of solvent resistance, toughness, impact resistance, strength, ease of processing, formability, and thermal resistance. By including Schiff base (—CH=N—) linkages in the oligomer chain, the linear, advanced composites formed with polyester oligomers of our copending application U.S. Ser. No. 07/137,493 can have semiconductive or conductive properties when appropriately doped or reacted with appropriate metal salts.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) ease of processing, (4) impact resistance (and other matrix stress transfer capabilities), (5) retention of properties over a broad range of temperatures, and (6) thermooxidative resistance that is desirable on aerospace advanced composites. The prior art composites are often too brittle.

Thermally stable multidimensional oligomers having semiconductive or conductive properties when doped with suitable dopants are also known and are described in our copending applications (including U.S. patent application Ser. Nos. 06/773,381 and 07/212,404). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap to allow controlled crosslinking upon heat-induced or chemical-induced curing.

For imides and many other resin backbones, we have shown surprisingly high glass transition temperatures, reasonable processing parameters and constraints for making and using the prepregs, and desirable physical properties for the composites by using soluble oligomers having difunctional caps, especially those with nadic caps. Linear oligomers of this type include two crosslinking functionalities at each end of the resin chain to promote crosslinking upon curing. Linear oligomers are "monofunctional" when they have one crosslinking functionality at each end. The preferred linear oligomers from our earlier research are "difunctional," because they had two functional groups at each end. Upon curing, the crosslinking functionalities provide sites for chain extension. Similarly, multidimensional oligomers are difunctional when each arm terminates with two caps. Because the crosslinks were generally the weakest portions of the resulting composite, we improved thermooxidative stability of the composites by including two crosslinks at each junction. We built in redundancy, then, at each weak point. We maintained solubility of the reactants and resins using, primarily, phenoxyphenyl sulfone chemistries. Our work during the past fifteen years across a broad range of resin types or chemical families is described in the following, forty-nine U.S. Patents (all of which we incorporate by reference):

| INVENTOR | U.S. Pat. No. | TITLE | ISSUE DATE |
|---|---|---|---|
| Lubowitz et al. | 4,414,269 | Solvent Resistant Polysulfone and Polyethersulfone Composites | November 8, 1983 |
| Lubowitz et al. | 4,476,184 | Thermally Stable Polysulfone Compositions for Composite Structures | October 9, 1984 |
| Lubowitz et al. | 4,536,559 | Thermally Stable Polyimide Polysulfone Compositions for Composite Structures | August 20, 1985 |
| Lubowitz et al. | 4,547,553 | Polybutadiene Modified Polyester Compositions | October 15, 1985 |
| Lubowitz et al. | 4,584,364 | Phenolic-Capped Imide Sulfone Resins | April 22, 1986 |
| Lubowitz et al. | 4,661,604 | Monofunctional Crosslinking Imidophenols | April 28, 1987 |
| Lubowitz et al. | 4,684,714 | Method for Making Polyimide Oligomers | August 4, 1987 |
| Lubowitz et al. | 4,739,030 | Difunctional End-Cap Monomers | April 19, 1988 |
| Lubowitz et al. | 4,847,333 | Blended Polyamide Oligomers | July 11, 1989 |
| Lubowitz et al. | 4,851,495 | Polyetherimide Oligomers | July 25, 1989 |
| Lubowitz et al. | 4,851,501 | Polyethersulfone Prepregs, Composites, and Blends | July 25, 1989 |
| Lubowitz et al. | 4,868,270 | Heterocycle Sulfone Oligomers and Blends | September 19, 1989 |
| Lubowitz et al. | 4,871,475 | Method for Making Polysulfone and Polyethersulfone Oligomers | October 3, 1989 |
| Lubowitz et al. | 4,876,328 | Polyamide Oligomers | October 24, 1989 |
| Lubowitz et al. | 4,935,523 | Crosslinking Imidophenylamines | June 19, 1990 |
| Lubowitz et al. | 4,958,031 | Crosslinking Nitromonomers | September 18, 1990 |
| Lubowitz et al. | 4,965,336 | High Performance Heterocycle Oligomers and Blends | October 23, 1990 |
| Lubowitz et al. | 4,980,481 | Pyrimidine-Based End-Cap | December 25, 1990 |

-continued

| INVENTOR | U.S. Pat. No. | TITLE | ISSUE DATE |
|---|---|---|---|
| Lubowitz et al. | 4,981,922 | Monomers and Oligomers Blended Etherimide Oligomers | January 1, 1991 |
| Lubowitz et al. | 4,985,568 | Method of Making Crosslinking Imidophenyl-amines | January 15, 1991 |
| Lubowitz et al. | 4,990,624 | Intermediate Anhydrides Useful for Synthesizing Etherimides | February 5, 1991 |
| Lubowitz et al. | 5,011,905 | Polyimide Oligomers and Blends | April 30, 1991 |
| Lubowitz et al. | 5,066,541 | Multidimensional Heterocycle Sulfone Oligomers | November 19, 1991 |
| Lubowitz et al. | 5,071,941 | Multidimensional Ether Sulfone Oligomers | December 10, 1991 |
| Lubowitz et al. | 5,082,905 | Blended Heterocycles | January 21, 1992 |
| Lubowitz et al. | 5,087,701 | Phthalimide Acid Halides | February 11, 1992 |
| Lubowitz et al. | 5,104,967 | Amideimide Oligomers and Blends | April 14, 1992 |
| Lubowitz et al. | 5,109,105 | Polyamides | April 28, 1992 |
| Lubowitz et al. | 5,112,939 | Oligomers Having Pyrimidinyl End Caps | May 12, 1992 |
| Lubowitz et al. | 5,115,087 | Coreactive Imido Oligomer Blends | May 19, 1992 |
| Lubowitz et al. | 5,116,935 | High Performance Modified Cyanate Oligomers and Blends | May 26, 1992 |
| Lubowitz et al. | 5,120,819 | High Performance Heterocycles | June 9, 1992 |
| Lubowitz et al. | 5,126,410 | Advanced Heterocycle Oligomers | June 30, 1992 |
| Lubowitz et al. | 5,144,000 | Method for Forming Crosslinking Oligomers | September 1, 1992 |
| Lubowitz et al. | 5,151,487 | Method of Preparing a Crosslinking Oligomer | September 29, 1992 |
| Lubowitz et al. | 5,155,206 | Amideimide Oligomers, Blends and Sizings for Carbon Fiber Compo-sites | October 13, 1992 |
| Lubowitz et al. | 5,159,055 | Coreactive Oligomer Blends | October 27, 1992 |
| Lubowitz et al. | 5,175,233 | Multidimensional Ester or Ether Oligomers with Pyrimidinyl End Caps | December 29, 1992 |
| Lubowitz et al. | 5,175,234 | Lightly-Crosslinked Polyimides | December 29, 1992 |
| Lubowitz et al. | 5,175,304 | Halo- or Nitro-Intermediates Useful for Synthesizing Etherimides | December 29, 1992 |
| Lubowitz et al. | 5,198,526 | Heterocycle Oligomers with Multidimensional Morphology | March 30, 1993 |
| Lubowitz et al. | 5,210,213 | Multidimensional Crosslinkable Oligomers | May 11, 1993 |
| Lubowitz et al. | 5,216,117 | Amideimide Blends | June 1, 1993 |
| Lubowitz et al. | 5,227,461 | Extended Difunctional End-Cap Monomers | July 13, 1993 |
| Lubowitz et al. | Reissue 34,820 | Amideimide Sizing For Carbon Fiber | August 24, 1993 (originally issued) |
| Lubowitz et al. | 5,268,519 | Lightly Crosslinked Etherimide Oligomers | December 7, 1993 |
| Lubowitz et al. | 5,286,811 | Blended Polyimide Oligomers and Method of Curing Polyimides | February 15, 1994 |
| Lubowitz et al. | 5,344,894 | Polyimide Oligomers and Blends | September 6, 1994 |
| Lubowitz | 5,403,666 | Composites Containing Amideimide Sized Fibers | April 4, 1995 |

We recently described advanced oligomers that include as many as four caps at each end of the chains in U.S. patent application Ser. Nos. 08/327,942 and 08/327,180. Again, we add further redundancy at the weakest link in the cured composite. We also obtain micelles within the composite for increased compressive strength. Nevertheless, we have the increased processing questions from four reactive caps at each crosslinking site, making it more important that our processing window provide adequate flow in the curing cycle.

High speed aircraft, particularly the High Speed Civil Transport (HSCT), will likely be constructed from advanced composites. The flight regime for these commercial aircraft, however, impose difficult requirements on the materials. At the proposed supersonic speeds (of about Mach 2.2), the skin of the aircraft will be exposed to extreme heat. For success, the composites must withstand long exposure to such temperatures the composites will face thermal cycling for ascent and decent. If possible, the composites should have useful lives of about 120,000 hours. These requirements challenge all known materials. The polyimide oligomers of the present invention, nevertheless, are candidates to meet this challenge in the next century.

SUMMARY OF THE INVENTION

The present invention is directed to a family of polyimide thermoplastic oligomers for advanced composites that exhibit thermal stability, are readily processed, are resistant to attack by organic solvents, and have extreme thermo-oxidative and thermomechanical stability. The preferred oligomers have linear backbones with imide linkages along the polymer backbone contributing to the ability of the resins to carry mechanical loads at moderately high temperatures. Sulfone (—SO$_2$—), ether (—O—) or other electronegative linkages between aromatic groups provide improved toughness. Such preferred resins resist chemical stress corrosion, can be thermoformed, are chemically stable and, in addition, are processible at relatively low temperatures. In accordance with the invention, the preferred resins or oligomers are provided with multiple chemically functional, crosslinking imidophenylamine end caps at each end of the oligomer to lightly crosslink through addition polymerization upon curing. The oligomers of the invention include in the their backbone the residue of an ether dianhydride of the general formula:

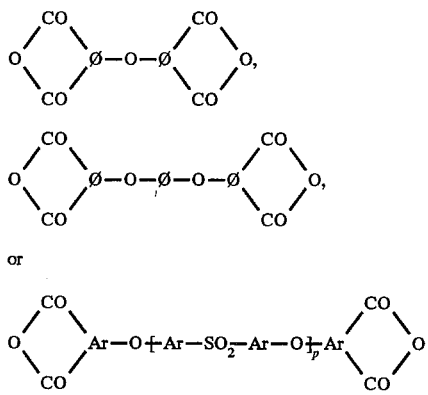

wherein
Ø=phenylene;
Ar=an aromatic radical; and
p=a small integer greater than or equal to 1, and generally equal to 1.

The diamine residues tyically add "sulfone" linkages to the backbone for toughness and retention of solubility in conventional processing solvents like NMP.

We prepare the oligomers by mixing together and reacting in a suitable solvent under an inert atmosphere:

1) 2 moles of an imidophenylamine end cap;
2) n moles of a diamine; and
3) n+1 moles of the ether dianhydride;

wherein n is selected so that the oligomer has an average formula molecular weight in the range within which the oligomer will possess thermoplastic properties usually between about 5,000 to 40,000, and preferably 5,000 and 15,000. Of course, we can prepare a comparable oligomer by using an extended anhydride end cap and by adjusting the ratio of diamine and dianhydride to N+1 diamine: N dianhydride.

The imidophenylamine end caps have the formula:

or

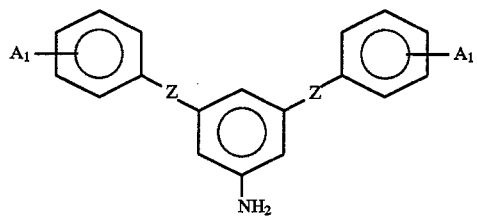

wherein A is selected from the group consisting of:

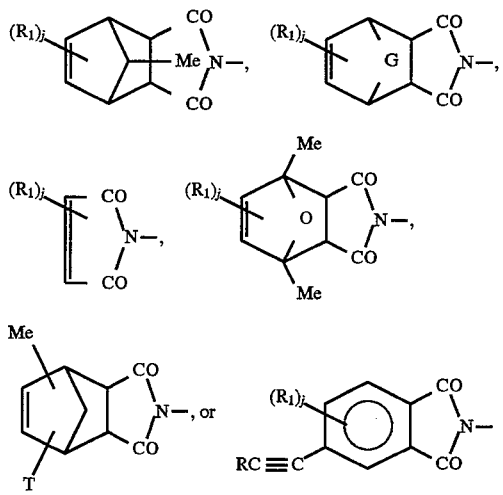

Z=—NHCO—
Me=methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
R=hydrogen, alkyl, or phenyl;
i=2; and
j=0, 1 or 2;

These imidophenylamine end caps provide two or four crosslinking sites at each end of the oligomer.

Polyimide oligomers in this preferred class exhibit impressive physical and chemical properties which make them particularly attractive for today's marketplace. The starting materials are relatively nonhazardous and nontoxic. Upon condensation, the oligomeric backbone is essentially fully imidized, thereby making the oligomers stable, relatively nonhazardous, and relatively nontoxic. Competing resins, like PMR-15, contain unreacted amine functionalities (since the prepregs comprise blends of the reactants rather than oligomers), and these resins present handling and storage problems. The polyimide oligomers of the present invention being fully-imidized, are shelf-stable at ambient temperature, thereby eliminating the need for refrigerated storage, a problem which plagues competing polyimide systems. Further, the oligomers remain soluble in conventional prepregging solvents so that the resins can readily be introduced into fabric reinforcements. The sulfone groups along the imide backbone, being strongly electronegative, ensure the solubility of the oligomer. The hydrocarbon unsaturation provided in the end caps provides two sites at each end of the oligomer (i.e. difunctional) for forming lightly crosslinked imide composites that cure at or around the temperatures for conventional, competing imide systems. Yet, these imide systems generally possess higher thermooxidative stability following curing. Finally, the oligomers melt in the temperature range where the crosslinking cure reaction is thermally induced, ensuring processibility of the prepregs to advanced composite materials.

The invention is also directed to multidimensional polyimide oligomers which include an aromatic amine-substituted hub (such as triaminobenzene) and three or more substantially identical radiating arms, each arm including one or more imide linkages and ether or "sulfone" linkages, and a crossing imidophenyl amine end cap. Such multidimensional oligomers have improved and higher use temperatures, often well above their curing temperatures, and thereby provide superior advanced composites. These multidimensional oligomers, nevertheless, exhibit processing characteristics comparable to conventional oligomers or resins.

Prepregs comprising the oligomers or blends and a reinforcing additive in fiber or particulate form and composites comprising cured oligomers or blends are the most preferred products of the oligomers and blends of the invention. We can prepare varnishes, films, or coatings.

DESCRIPTION OF THE PREFERRED EMBODIMENTS

The present application is a family of polyimide oligomers, prepregs, and composites possessing a superior combination of chemical and physical properties. Polyimide oligomers of the same general type are described in our copending U.S. patent application Ser. No. 08/327,942 and U.S. Pat. Nos. 5,001,905 and 5,175,234.

We synthesize monofunctional, crosslinkable, thermoplastic polyimide oligomers by reacting:

1) 2 moles of a monoanhydride end cap;
2) n+1 moles of a diamine having terminal amino groups; and
3) n moles of an ether dianhydride;

wherein n is selected so that the oligomer has an average molecular weight between 5,000 and 40,000. The reaction usually occurs by mixing all three reactants in a suitable solvent in the presence of an inert atmosphere. Heating the mixture increases the reaction rate. Excess diamine and dianhydride may be provided, although substantially stoichiometric amounts are preferred. The LARC family of polyimides generally are similar with the dianhydride, diamine or both being an aromatic ether (i.e., an arylate). We can improve the properties of these products by using an anhydride cap of the formula:

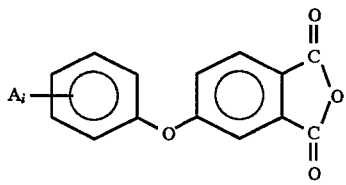

rather than

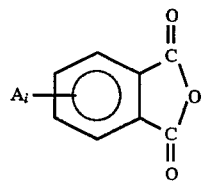

as common with the LARC resins.

In the present invention, the average molecular weight of the resulting polyimide oligomer should be between 5,000 and 40,000 to provide thermoplastic character to the oligomer, and is preferably between about 5,000 and 30,000 and still more preferably between 5,000 and 15,000. Mixtures of oligomers may also be used. For example, an oligomer having a molecular weight of 10,000 may be mixed with one having a molecular weight of 30,000, or an oligomer having a molecular weight of 5,000 may be mixed with one having a molecular weight of 35,000 or 40,000. The MWs we prefer generally exceed those of LARC polyimides.

Within the preferred range, we can crosslink the oligomers to form polymers that are relatively easy to process, are tough, have impact resistance, and possess superior thermomechanical properties. When oligomers having molecular weights less than about 5,000 are cured by crosslinking, the thermosetting character of the material is increased so that the ability of the material to be thermoformed is reduced or eliminated.

The monoanhydride preferably has the reactive cap selected from:

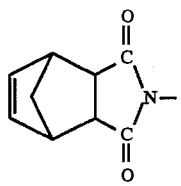

or

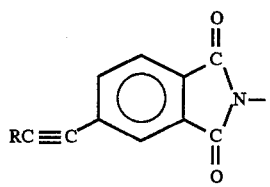

Our preferred diamines have the formula:

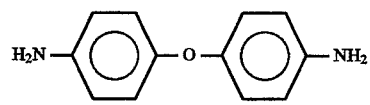

or

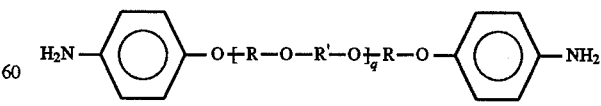

wherein R and R' are aromatic radicals, at least one of R and R' being a diaryl radical wherein the aryl rings are joined by a "sulfone" linkage [that is, —O—, —S—, —SO$_2$—, —CO—, —(CF$_3$)$_2$C—, or —(Me)$_2$C—, and q is an integer from 0 to 27 inclusive. Preferably R is selected from the group consisting of:

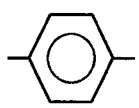

or

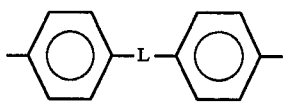

wherein L=—SO$_2$—, —(CF$_3$)$_2$C—, or —S—. R' is preferably selected from the group consisting of:

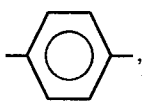,

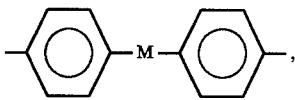, or

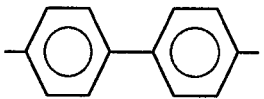

wherein M=—SO$_2$—, —S—, —O—, —(Me)$_2$C—, or —(CF$_3$)$_2$C—.

Each aryl group may include substituents for the replaceable hydrogens, the substituents being selected from the group consisting of halogen, alkyl groups having 1–4 carbon atoms, and alkoxy groups having 1–4 carbon atoms. Although the para-isomers are shown (and the resulting molecules are linear), meta-isomers may be used to form ribbon-like chains. The isomers (para- and meta-) may be mixed.

The diamines generally contain at least one phenoxyphenylsulfone group, such as:

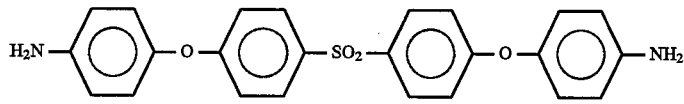

and

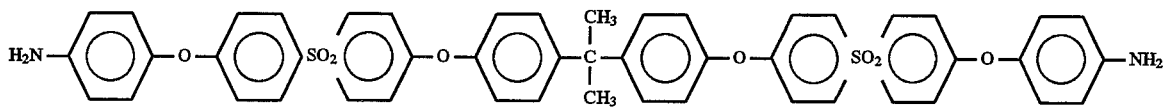

These diamines have alternating ether and "sulfone" linkages, wherein "sulfone" designates an electronegative linkage.

The molecular weights of the preferred aryl diamines described above vary from approximately 500–10,000. The amino groups and other substituents can be positioned either para or meta, as previously discussed. Lower molecular weight diamines are preferred.

In our thermoplastic, crosslinkable oligomers just described, the dianhydride preferably is 5-(2,5-diketotetrahydrofuryl)-3-methyl-3-cyclohexene-1,2-dicarboxylic anhydride (MCTC), [an unsaturated, aliphatic dianhydride] or an ether dianhydride:

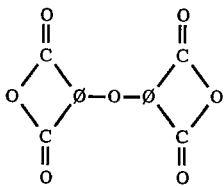

The diamines and dianhydrides react to form repeating imide linkages along the generally linear backbone of the oligomers. Preferred properties in this oligomer are obtained when the backbone is periodically disrupted by the inclusion of an aliphatic moiety, especially an MCTC residue.

Diamines which include phenoxyphenylsulfone or diphenoxy moieties are preferred, since these diamines provide the blend of physical properties in the oligomers which are desired. Impact resistance and toughness is afforded with the "sulfone" linkages which act as joints or swivels between the aryl groups. The aliphatic residues, such as MCTC, provide lower melt temperatures, and allow the use of lower temperature end caps, such as oxynadic and dimethyl oxynadic (DONA) end caps. The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio). Of course, they also have lower use temperatures because of their aliphatic components.

Oligomers of the present invention may be used to form prepregs by the conventional method of impregnating a suitable fabric with a mixture of the oligomer and a solvent. Suitable coreactants, such as o-phenylenediamine, benzidine, and 4,4'-methylenedianiline, may be added to the solvent when preparing prepregs, especially those having maleic end caps.

The prepregs may be cured by conventional vacuum bag techniques to crosslink the end caps. Temperatures suitable for curing are in the range of 150°–65° F. The resulting product is a cured, thermally stable, solvent-resistant composite. The crosslinked oligomer may also be used as an adhesive without curing. Such adhesives may be filled, if desired.

The combination of monoanhydride, diamine, and dianhydride for oligomers of the present invention can be selected to achieve an oligomer having a desired thermal stability (use temperature) within a relatively wide range. For example, oxynadic anhydride and dimethyl oxynadic anhydride have lower activation temperatures (generally around 400°–450° F.) and are best suited in oligomers which melt at or near this temperature range. An unsaturated, aliphatic dianhydride, such as MCTC, with electronegative "sulfone" linkages reduces the melt temperatures sufficiently to allow use of oxynadic anhydride and dimethyl oxynadic anhydride end caps in otherwise aryl sulfone backbone oligomers. Nadic anhydride or methyl nadic anhydride have intermediate activation temperatures (around 600°–650° F.) and are best suited for use in oligomers with melt (glass transition) temperatures near this range. Acetylenic phenyl anhydrides which we prefer for the higher melting polyimides we seek here have higher activation temperatures (around 650°–700° F.). It is important that the oligomer flow near the curing (activation) temperature of the end caps. It also is important, we have found, that the activation of the caps be delayed if the melt temperature is close to the boiling point of the solvent. We prefer the acetylenic caps when the oligomers are prepreged in NMP.

We can prepare similar oligomers by condensation of amines, diamines, and dianhydrides. These oligomers are actually preferred, because they can be difunctional or multiple chemically functional, thereby improving the solvent-resistance and thermal stability. Such oligomers are synthesized by condensing:

2 moles of an amine end cap;

n moles of a diamine; and n+1 moles of a dianhydride, wherein n is selected so that the oligomers exhibit thermoplastic properties, as previously explained.

The amine end caps have the general formula:

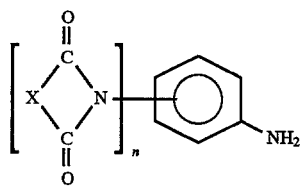

wherein X is as previously defined for the monoanhydrides and n=1 or 2. We prepare these amine end caps by reacting the monoanhydrides with phenylene diamine or triaminobenzene, or by rearranging an acid amide analog to the desired cap as described in U.S. patent application Ser. No. 07/046,202.

Difunctional crosslinkable oligomers exhibit better thermomechanical properties than conventional capped or uncapped polyimides of the LARC type. When cured, the difunctional caps double the number of crosslinks that form, thereby stabilizing the composites and increasing the solvent resistance.

In our earlier patents, the difunctional crosslinking polyimides constitute a broader class of novel oligomers than the corresponding class of monofunctional polyimides. That is, the diamines and dianhydrides for this difunctional class were dram from a broader list, and included, any aromatic or aliphatic diamine or dianhydride. Lower molecular weight aromatic diamines and dianhydrides are preferred. We emphasize particular polyimide backbones in this invention to achieve the properties important for tomorrow's high speed aircraft.

To this end, the diamine may be selected from the group consisting of:

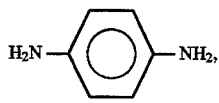

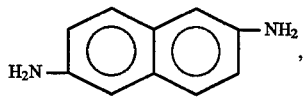

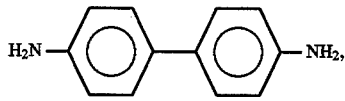

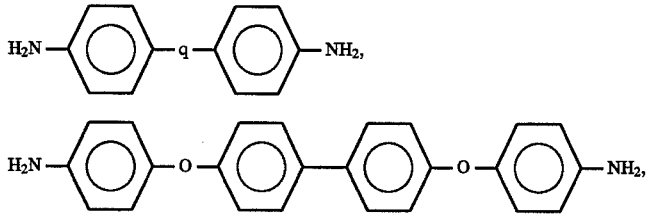

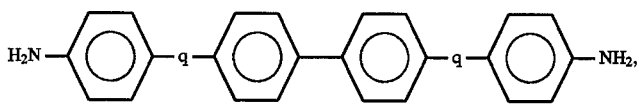

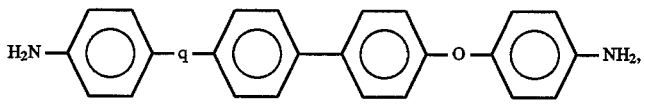

-continued
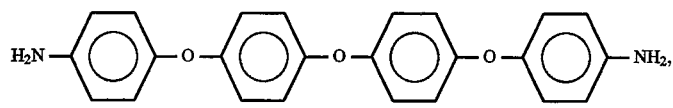
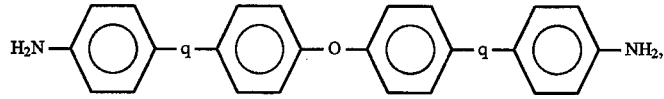
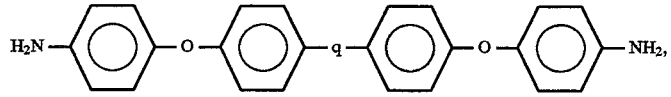
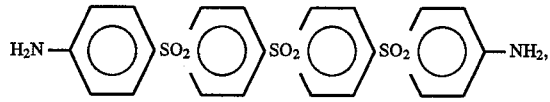
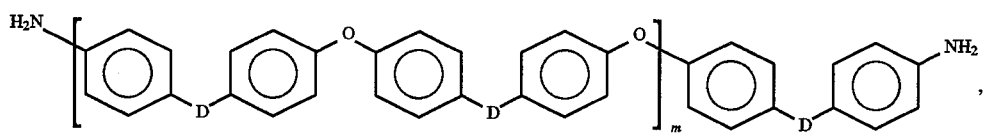
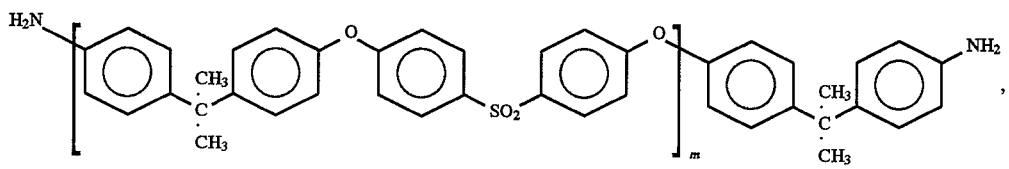
or
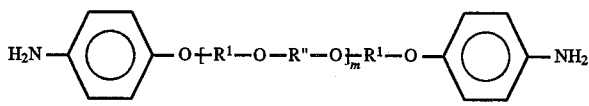
wherein R$^1$ =
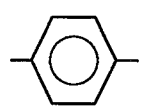
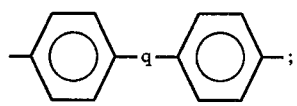
R" =
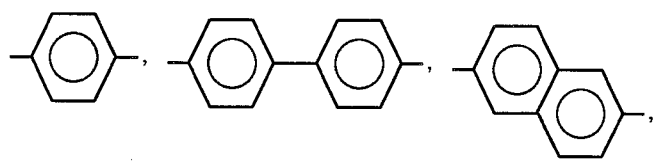
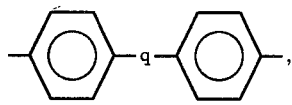
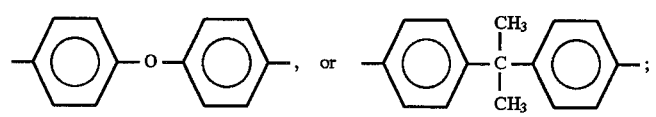
q=—SO$_2$—, —CO—, —S—, —O—, or —(CF$_3$)$_2$C—, and preferably —SO$_2$— or —CO—;
Me=methyl;
m=an integer, generally less than 5, and preferably 0 or 1; and
D=any of —CO—, —SO$_2$—, or —(CF$_3$)$_2$C—.

Other diamines include those described in U.S. Pat. Nos. 4,504,632; 4,058,505; 4,576,857; 4,251,417; and 4,251,418. Polyaryl ether "sulfone" diamines are preferred, since these diamines provide high thermal stability to the resulting oligomers and composites and contribute to the solubility of the oligomer to enhance processing. Mixtures of diamines might be used.

If the diamine has the formula:

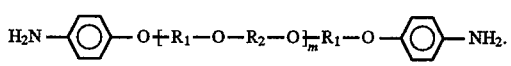

$R_1$ is generally selected from the group consisting of:

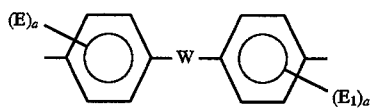

wherein W=—SO$_2$—, —S—, or —(CF$_3$)$_2$C—; and $R_2$ is selected from the group consisting of:

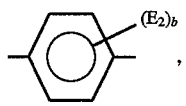

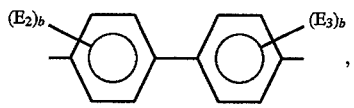

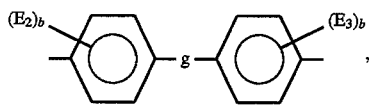

-continued

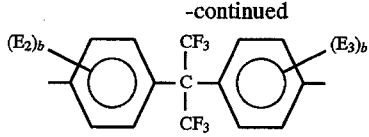

or mixtures thereof, wherein E, $E_1$, $E_2$, and $E_3$ each represent substituents selected from the group consisting of halogen, alkyl groups having 1 to 4 carbon atoms, and alkoxy groups having 1 to 4 carbon atoms, and "a" and "b" are each an integer having a value of 0 to 4.

Particularly preferred compounds are those in which $R_1$ is

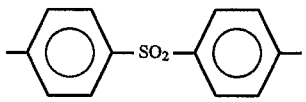

and $R_2$ is

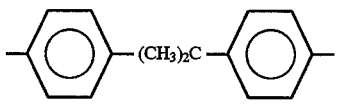

so that the phenoxyphenyl sulfone diamines include:

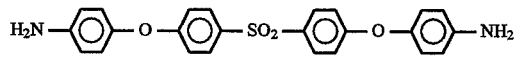

and

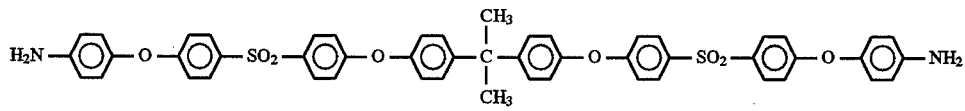

-continued

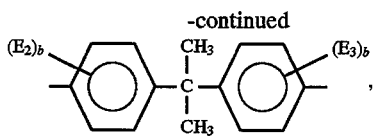

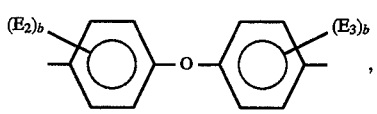

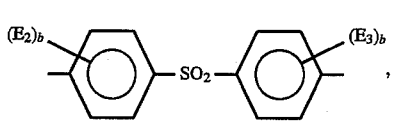

or

The molecular weights of these diamines can be varied from approximately 500 to about 2000. Using lower molecular weight diamines enhances the mechanical properties of the difunctional polyimide oligomers, each of which preferably has alternating ether "sulfone" segments in the backbones as indicated above.

We can prepare phenoxyphenyl sulfone diamines of this general nature by reacting two moles of aminophenol with (n+1) moles of an aryl radical having terminal, reactive halide functional groups (dihalogens), such as 4,4'-dichlorodiphenyl sulfone, and n moles of a suitable bisphenol (dihydroxy aryl compounds). The bisphenol is preferably selected from the group consisting of:
2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;

1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Bisphenols having aromatic character (i.e., absence of aliphatic segments), such as bisphenol A, are preferred.

The dihalogens in this circumstance preferably are selected from the group consisting of:

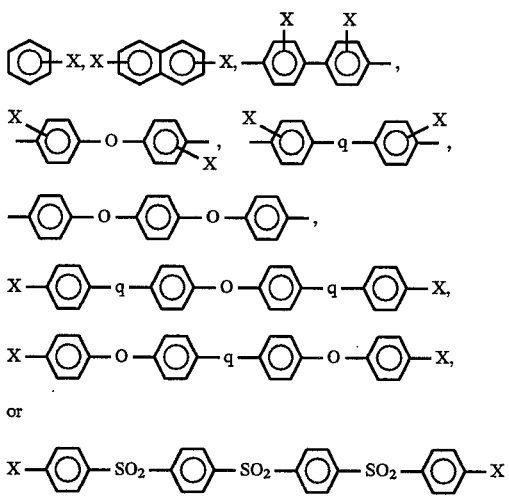

wherein

X=halogen, preferably chlorine; and q=—S—, —SO$_2$—, —CO—, —(CH$_3$)$_2$C—, —O—, and —(CF$_3$)$_2$C—, and preferably either —SO$_2$— or —CO—.

The condensation reaction creates diamine ethers that ordinarily include intermediate "sulfone" linkages. The condensation generally occurs through a phenate mechanism in the presence of K$_2$CO$_3$ or another base in a DMSO/toluene solvent. The grain size of the K$_2$CO$_3$(s) should fall within the 100–250 ANSI mesh range.

While para isomerization is shown for these diamines, other isomers are possible. Furthermore, the aryl groups can have substituents, if desired, such as halogen, lower alkyl up to about 4 carbon atoms, lower alkoxy up to about 4 carbon atoms or aryl. Substituents may create steric hindrance problems in synthesizing the oligomers or in crosslinking the oligomers into the final composites.

The dianhydride used in the polyimide synthesis preferably is selected from the group consisting of:

(a) phenoxyphenyl sulfone dianhydride;
(b) pyromellitic dianhydride;
(c) benzophenonetetracarboxylic dianhydride (BTDA);
(d) 5-(2,5-diketotetrahydrofuryl)-3-methylcyclohexene-1,2-dicarboxylic anhydride (MCTC); and (e)

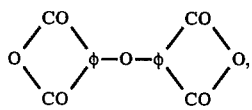

which we prefer.

but may be any aromatic or aliphatic dianhydride, such as those disclosed in U.S. Pat. Nos. 4,504,632; 4,577,034; 4,197,397; 4,251,417; 4,251,418; or 4,251,420. Mixtures of dianhydrides might be used.

We can make blended oligomers suitable for composites by blending a substantially equimolar amount of a comparable polymer that is incapable of cross-linking with the crosslinkable oligomers. These blends merge the desired properties of crosslinking oligomers and noncrosslinking polymers to provide tough, yet processible, resin blends. The comparable polymer is usually synthesized by condensing the same diamine of the crosslinking oligomer with the same dianhydride of the crosslinking oligomer and quenching the polymerization with a suitable terminating group. In this way, the comparable oligomer has the identical backbone to that of the crosslinkable oligomer but does not have the crosslinkable end caps. Generally the terminating group will be a simple anhydride, such as benzoic anhydride, added to the diamine and dianhydride to quench the polymerization and to achieve and average formula weight for the comparable oligomer substantially equal to that of the crosslinkable oligomer. The oligomer may have mono- or difunctional crosslinking end caps.

We can increase impact resistance of the cured composites formed from prepregs of the oligomers without deleterious loss of solvent resistance by forming the prepregs with a blend of capped oligomers to provide crosslinking upon curing and uncapped polymers. A blend of oligomer and polymer is preferably formed by dissolving the capped oligomer in a suitable first solvent, dissolving the uncapped polymer in a separate portion of the same solvent or in a solvent miscible with the first solvent, mixing the two solvent solutions to form a lacquer, and applying the lacquer to fabric in a conventional prepregging process.

Although the polymer in the blend usually has the same length backbone as the oligomer (upon curing), the properties of the composite formed from the blend can be adjusted by altering the ratio of formula weights for the polymer and oligomer. The terminal groups of the polymer are unimportant so long as these groups do not react with or impede the crosslinking of the oligomer end caps. Also, it is probably nonessential that the oligomer and polymer have identical repeating units, but that the oligomer and polymer merely be compatible in the mixed solution or lacquer prior to sweeping out the blend as a prepreg. Of course, if the polymer and oligomer have identical backbones, compatibility in the blend is more likely to occur.

We can prepare prepregs of the oligomers or blends by conventional techniques. While woven fabrics are the typical reinforcement, the fibers can be continuous or discontinuous (in chopped or whisker form) and may be ceramic, organic, carbon (graphite), or glass, as suited for the desired application.

We can cure the oligomers or prepregs in conventional vacuum bag techniques to composites, or can use the oligomers as adhesives, varnishes, films, or coatings.

The most preferred linear polyimides are prepared with dianhydrides selected from para- and meta- dianhydrides of the general formula:

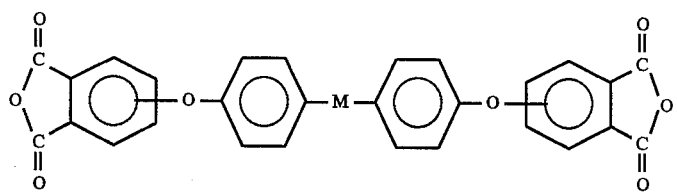

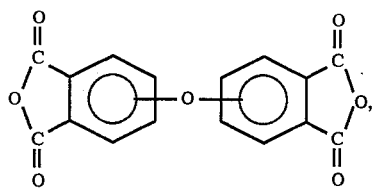

or

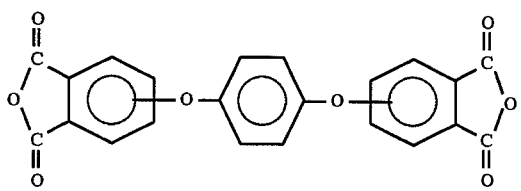

wherein M=—SO$_2$— or —CO—.

We make multidimensional oligomers by condensing the diamines, dianhydrides, and end caps with a suitable amine hub, such as triaminobenzene. For example, triaminobenzene can be reacted with the preferred dianhydride and amine end cap to produce a multidimensional, crosslinkable polyimide possessing mono—, di, or multiple chemically functional crosslinking capability. Diamines can be used for chain extension of each arm. Short arms of relatively low formula weight are preferred. The multidimensional oligomers have surprisingly high thermal stabilities upon curing.

Suitable hubs include aromatic compounds having at least three amine functionalities. Such hubs include phenyl, naphthyl, biphenyl, azalinyl amines (including melamine radicals), or triazine derivatives described in U.S. Pat. No. 4,574,154 of the general formula:

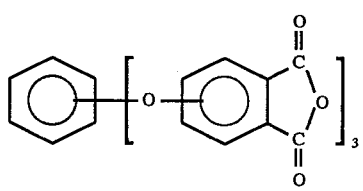

wherein R$_2$ is a divalent hydrocarbon residue containing 1–12 carbon atoms (and, preferably, ethylene).

We can prepare additional hubs for multidimensional polyimides by reacting the corresponding hydroxy-substituted hub (such as phloroglucinol) with nitrophthalic anhydride to form trianhydride compounds represented by the formula:

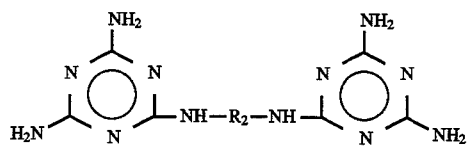

The trianhydride can then be reacted (1) with an amine end cap to form etherimide, multidimensional oligomers or (2) with suitable diamines, dianhydrides, monoanhydride end caps, or amine end caps to form multidimensional polyimides with extended arm lengths.

We can form yet another class of hubs by reacting the corresponding halo-hub (such as tribromobenzene) with aminophenol to form triamine compounds represented by the formula:

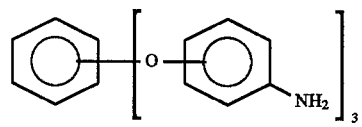

and can react these triamine hubs with monoanhydride end caps to form "star" oligomers having three crosslinking sites, or with suitable dianhydrides diamines. And mono, di; or multi-functional crosslinking amine end caps, if difunctional crosslinking or extended arm lengths are desired. The use of amine end caps allows six or twelve crosslinking sites to be incorporated into the ("star-burst") oligomers.

Finally, another class of suitable hubs comprises amines having extended arms. For example, mix tribromobenzene with p-aminophenol and 4,4'-dibromodiphenylsulfone and react under an inert atmosphere at an elevated temperature to achieve an amino terminated "star" of the general formula:

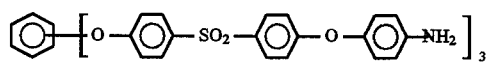

Then react this intermediate with the end caps; or end caps and dianhydrides; or end caps and dianhydrides and diamines, as desired. Those skilled in the art will recognize the generality of the reaction scheme for preparing a family of extended arm amine hubs.

The best results are likely to occur when the arm length is as short as possible and the oligomer has six crosslinking sites. The most preferred hub includes the phenyl radical, since these compounds are relatively inexpensive, are more readily obtained, and provide oligomers with high thermal stability.

Even higher thermal stabilities than those previously described for the linear polyimides are believed to be achievable with the multidimensional oligomers, particularly with those of the general formula:

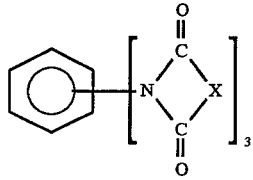

wherein X is as previously defined.

Blends of the multidimensional oligomers are possible, but these compounds are not preferred. Such a blend might include

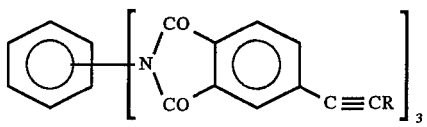

wherein R=hydrogen, alkyl, or phenyl with an equimolar mixture of

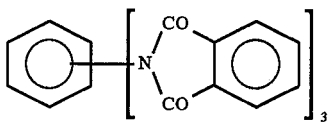

Those skilled in the art will recognize other blends that can be prepared.

Solvent resistant, thermoplastic aromatic poly (imidesulfone) oligomers are also described in U.S. Pat. Nos. 4,398,021 and 4,489,027. Melt-fusible polyimides made by the condensation of dianhydrides and diamines are described in U.S. Pat. No. 4,485,140.

Now turning to the special family of oligomers of the present invention, the most preferred polymide oligomers are difunctional or multiple chemically functional, crosslinkable, polyimide oligomers formed by the simultaneous condensation of:

(a) 2 moles of a difunctional or higher functional imidophenylamine end cap;
(b) n moles of a diamine; and
(c) n+1 moles of an ether sulfone or other dianhydride;

wherein n preferably is selected so that the oligomer has an average formula molecular weight in the range between about 5,000 and 15,000 and possesses thermoplastic properties. Such oligomers exhibit a stable shelf life in the prepreg form, even at room temperature, and have acceptable handling and processing characteristics comparable to those of K-3 or PMR-15. They also display comparable shear/compression/tensile properties to PMR-15, and improved toughness, especially when reinforced with sized carbon fibers of high modulus. Advantageously these materials are usable for extended exposure to temperatures of 200° C. (400° F.) or above.

Difunctional, crosslinking, imidophenylamine end caps used in preparing such oligomers have the general formula:

wherein A is selected from the group consisting of:

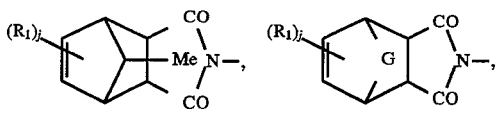

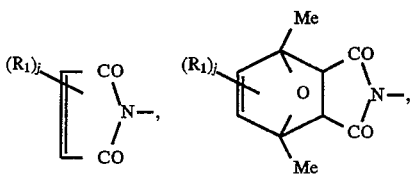

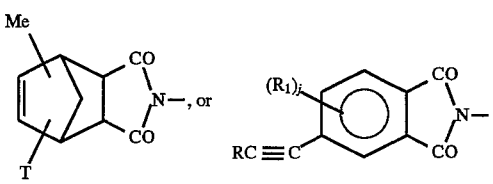

wherein

Me=Methyl;

G=—O—, —SO$_2$—, —CH$_2$—, or —S—;

T=allyl or methallyl;

R$_1$=lower alkoxy, aryl, substituted aryl, lower alkyl, substituted alkyl, aryloxy, or halogen;

i=2; and j=0, 1 or 2;

R=hydrogen alkyl, or phenyl

The preferred imidophenylamine end caps are the 3,5-isomer or a mixture of the 2,4- and 3,5-isomers having the formula:

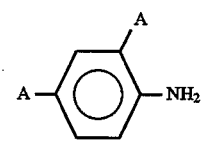

in which

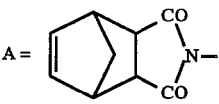

We prepare difunctional, crosslinking inidophenylamine end caps by the method described in copending, U.S. application Ser. No. 07/046,202.

In our copending U.S. patent application Ser. No. 08/327, 942 (which we incorporate by reference) we describe oligomers that have multiple chemically function caps which we also can use with the polyimide oligomers of the present invention. The multiple chemically functional caps have the general formula:

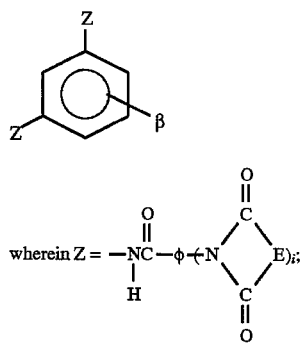

wherein Z = 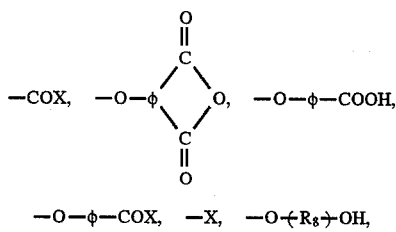

β=the residue an organic radical selected from the group consisting of:

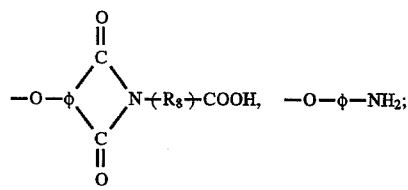

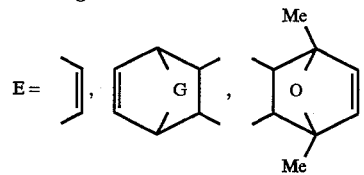

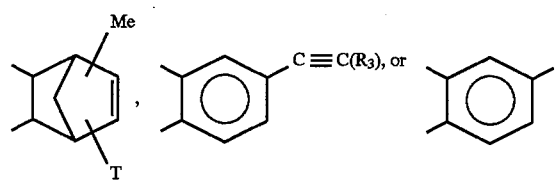

$R_8$=a divalent organic radical;

X=halogen;

Me=methyl;

T=allyl or methallyl;

G=—$CH_2$—, —S—, —SO—, —O—, —$CHR_3$—, or —$C(R_3)_2$—;

i =1 or 2;

$R_3$=hydrogen, lower alkyl, lower alkoxy, aryl, or aryloxy; and

Θ=—C≡N, —O—C≡N, —S—C≡N, or —$CR_3$=C $(R_3)_2$.

Of course, for synthesis of imides, the β group usually will be either:

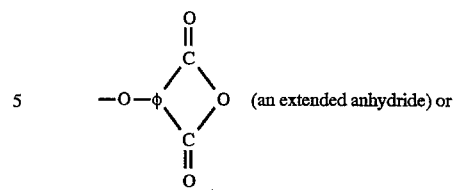  (an extended anhydride) or

—O—φ—$NH_2$  (an extended amine)

The dianhydride component of the most preferred polyimide oligomers has the general formula:

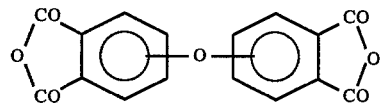

wherein

Ar=an aromatic radical; and p=a small integer greater than or equal to 1.

The diamine component is a lower alkylene diamine or, a polyaryl diamine having the general formula:

$H_2N$—φ—O—φ—$NH_2$, $H_2N$—φ—O—φ—O—φ—$NH_2$, $H_2N$—Ar—O$+$Ar—$L_1$—Ar$\frac{}{m}$O—Ar—$NH_2$ or $H_2N$—Ar—$L_2$—Ar—$NH_2$ wherein Ar=an aromatic radical;

$L_1$=a linkage selected from the group consisting of —$SO_2$—, —S—, —CO—, —$(CF_3)_2C$—, and $(CH_3)_2C$—;

$L_2$=a linkage selected from the group consisting of —$SO_2$—, —O—, —S—, and —$CH_2$—; and m=a small integer greater than or equal to 1.

The preferred diamines are 3,3'-phenoxyphenylsulfone diamine, 4,4'-phenoxphenylsulfone diamine, 4,4'-diaminodiphenylsulfone, 4,4'-diaminodiphenyl ether and methylene diamine or mixtures thereof. Particularly preferred is a 50:50 molar mixture of 3,3'-phenoxyphenylsulfone diamine and 4,4'-diaminodiphenylsulfone (available from Ciba- Geigy Corp. under the trade designation "Eporal"). Higher temperature oligomers within the class of preferred oligomers can be prepared using the shorter chain diamines, particularly 4,4'-diaminodiphenyl- sulfone. The best results may be achievable by replacing the sulfone linkage —$SO_2$— with a smaller linkage such as —O—, —S—, or —$CH_2$—. Although para isomerization is shown above, other isomers of the diamines are possible.

The oligomers are formed by reacting the three reactants in a suitable solvent in the presence of an inert atmosphere. The resultant oligomers have the general formula:

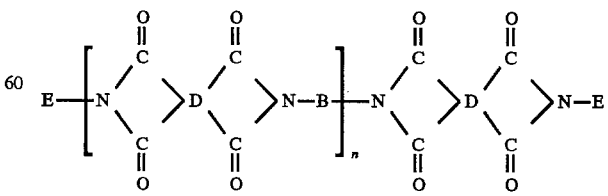

wherein E is the residue of the imidophenylamine end cap component, D is the residue of the dianhydride components, B is the residue of the diamine component and n is selected so that the oligomer is thermoplastic, generally having an average formula molecular weight of between about 5,000 and 15,000. Lower formula molecular weight oligomers in the range of about 5,000 and 10,000 may not be fully imidized, and are, therefore, not the most preferred formulations.

We can make blends of the preferred difunctional, crosslinkable, polyimide oligomers and a comparable, noncrosslinking polymer prepared from the same diamine and dianhydride of the oligomer or other compatible polymers by blending substantially equimolar amounts of the oligomer and comparable polymer. We synthesize the compatible polymer can be formed by condensing the same diamine and dianhydride of the oligomer and quenching the polymerization with a suitable terminating group so that the polymer has the same backbone as the crosslinking oligomer but does not have the crosslinkable end caps.

In another aspect of the invention, we can improve the thermal stability of the capped polyimide oligomers by post-curing the composites formed from such oligomers at a temperature of approximately 700° F. Such post-curing treatment advantageously raises the dynamic mechanical analysis peak (and β-transition) of the treated composites, presumably by causing full crosslinking of the end cap functionalities. Preferably, the post-curing treatment of the composites at a temperature of about 700° F. is carried out for a period of approximately 30 minutes, but this period may vary somewhat depending upon the particular composite being treated.

The thermal stabilities achievable with such post-curing treatment are significantly higher than those generally realized without the treatment. For example, for a difunctional polyimide oligomer having a formula molecular weight of about 15,000 and prepared as previously described by reacting a difunctional imidophenylamine end cap, 4,4'-phenoxyphenylsulfone dianhydride and a 50:50 molar mixture of 3,3'-phenoxyphenylsulfone diamine and 4,4'-diaminodiphenylsulfone, post-curing at a temperature of approximately 700° F. results in a DMA transition temperature of about 350° C., some 40°–50° C. higher than without the post-cure treatment. Similar improvements are realizable with other difunctional and monofunctional polyimide oligomers.

In carrying out the post-cure treatment, a prepreg is first formed by impregnating a fabric with a polyimide oligomer. The fabric can be any of the types previously described. The prepreg is heated at an elevated temperature (e.g. 450° F.) and under pressure (e.g. 100 psi) for a time sufficient to cure the prepreg and form a composite. The resulting composite is then post-cured at a temperature of approximately 700° F. for a time sufficient to improve the thermal stability thereof.

The post-curing treatment can also be advantageously carried out on blends of polyimide oligomers and comparable, noncrosslinking polymers and on multidimensional, crosslinkable polyimide oligomers and blends.

The following examples are presented to better illustrate various features of the invention.

EXAMPLE 1

Synthesis of high performance polyimide oligomers (Average Formula Weight 15,000)

In a reaction flask we condensed 3,3'-phenoxyphenylsulfone diamine (SDA), 4,4'-phenoxyphenylsulfone dianhydride, and an end cap amine monomer of the formula:

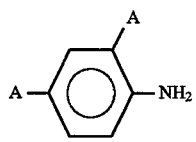

in which

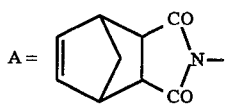

and recovered the oligomer product. DMA thermal analyses of carbon fiber prepregs and composites made from the oligomer showed initial transition temperatures for both the prepreg and composite around 220° C. and a secondary transition (corresponding to the glass transition of the composite) at about 260° C.

EXAMPLES 2–8

We synthesized additional high performance polyimide oligomers using the nadic imidophenylamine end cap identified in Example 1 with 4,4'-phenoxyphenylsulfone dianhydride and different diamines as set forth in Table I as follows:

TABLE I

| | FMW | Diamine | Prepreg T1 | Prepreg T2 | Composite T1 | Composite T2 |
|---|---|---|---|---|---|---|
| 2. | 5,000 | SDA | 197 | — | — | — |
| 3. | 10,000 | SDA | 230 | — | 220 | 220 |
| 4. | 15,000 | SDA/Eporal* | 240 | — | 250 | 260 |
| 5. | 15,000 | Eporal | 280 | — | 319 | 395 |
| 6. | 15,000 | ODA/Eporal/SDA* | 234 | — | 300 | 343 |
| 7. | 15,000 | Eporal/ODA* | 225 | — | 281 | 320 |
| 8. | 15,000 | Eporal/PPD* | — | — | — | — |

FMW = average formula molecular weight
ODA = 4,4'-Oxydianiline
Eporal = 4,4'-diaminodiphenyl sulfone
PPD = 2,2'-phenoxyphenyldiamine
*signifies equal molar proportions of the identified diamines

EXAMPLES 9 AND 10

We tested composites of the oligomers of Examples 4 and 5 were retested following a post-cure treatment of about 30 min at 700° F. The results are summarized in Table II:

TABLE II

| | Diamine | Composite DMA (°C.) T1 | Composite DMA (°C.) T2 |
|---|---|---|---|
| 9. | SDA/Eporal | 271 | 327 |
| 10. | Eporal | 352 | 397 |

The post-cure achieved an upward shift in the glass transition of between about 40°–60° C. (about 100° F.), greatly increasing the use temperature for these polyimides.

Aerospace composites have even more rigorous demands than we were able to achieve with our previous polyimide oligomers, so we continued our research. With nadic-capped oligomers in NMP solvents, we discovered that the flow or melt temperature for the thermoplastic formulations was too close to the thermal activation temperature of the nadic cap, so we were unable to drive off the excess solvent adequately prior to the initiation of the cure. The NMP boiled at around the temperature at which the nadic cap cured, which also made the curing operation difficult. Furthermore, surprisingly, our test coupons exhibited some solvent sensitivity which we attributed to the soluble ("sulfone") backbone.

To resolve the first problem, we tested phenylethynyl end caps of the formula:

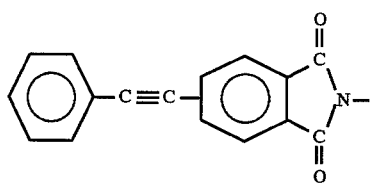

and discovered that we could increase the temperature difference between the melt and the onset of cure to allow the escape of the solvent. Thus, we prepared better composites with reduced porosity as required for aerospace primary structure.

To resolve the solvent sensitivity, we decided to reduce the oligomer's solubility by introducing in the backbone arylates linkages (i.e., —Ø—O—) instead of phenoxyphenyl sulfone linkages. We achieved an acceptable compromise of processing and performance. We also discovered that the monofunctional phenylethynyl cap (PEPA) increased the solvent sensitivity (exacerbated the problem), forcing us to a more resistant backbone and toward multiple (i.e., difunctional or more) chemically functional caps. Our tests showed that the modified backbone enhanced solvent resistance in MEK sensitivity test, Di-PEPA oligomers yielded a higher glass transition temperature, better MEK resistance, but lower fracture toughness. These experimental results are summarized in Table III.

TABLE III

|  | PI-3 | PI-4 |
| --- | --- | --- |
| Backbone | Standard | MEK-Resistant |
| End-cap | Di-PEPA | Di-PEPA |
| Mol. Wt., Theo./Actual | 5000/4050 | 5000/4163 |
| Cure Cycle | 1 + 2 hr/662° F. | 1 + 2 hr/662° F. |
| Cured DSC Tg, °C. | 292 | 285 |
| DMA Dry, 3° C./min, 10 Hz Tg, E'/E", °C. Modulus @ 25° C., ksi | 291/317 440 | 286/310 423 |
| DMA 1 day in MEK, Tg, E'/E", °C. Modulus @ 25° C., ksi Weight gain, % | 291/318 438 0.28 | 283/308 432 0.21 |
| DMA 7 day in MEK, Tg, E'/E", °C. Modulus @ 25° C., ksi Weight gain, % | 282/312 432 1.1 | 277/304 445 0.9 |
| $K_{1c}Ib\ in^{0.5}/in^2$ ($J/m^2$) | 1.57 275 | 2.25 393 |

Our preferred backbone includes the condensation product of our phenoxyphenyl sulfone dianhydride with a diamine selected from the group consisting of:

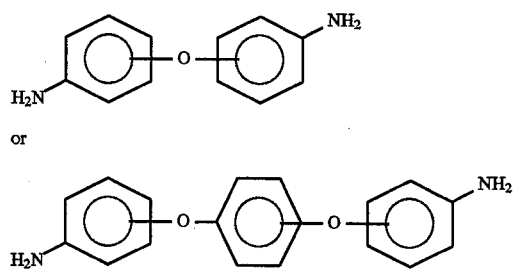

or mixtures thereof. We can increase solvent resistance (while decreasing solubility), however, by using a mixture of two or more dianhydrides selected from the group consisting of:

phenoxyphenyl sulfone dianhydride;
BTDA; and

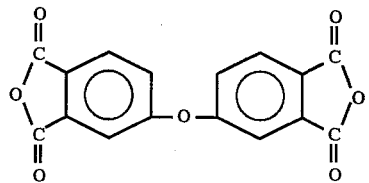

especially with PEPA, dinadic, diPEPA or multiple chemically functional end caps.

Alternatively, we can retain solubility by using a mixture of at least two diamines wherein one of the diamines is a phenoxyphenyl sulfone diamine of the general formula:

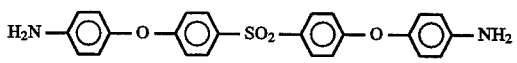

In this case, the other diamine would typically be ODA or $H_2N$—Ø—O—Ø—O—Ø—$NH_2$, as previously described.

While we have described preferred embodiments, those skilled in the art will recognize modifications or variations which might be made without departing from the inventive concept. Therefore, the description and claims should be interpreted liberally with only such limitation as is necessary in view of the pertinent prior art.

We claim:

1. A polyimide oligomer obtained by reacting in a solvent under an inert gas atmosphere a mixture comprising:

(a) two moles of a crosslinkable imidophenylamine end cap having the general formula:

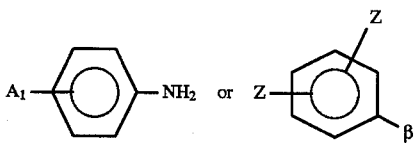

wherein A is:

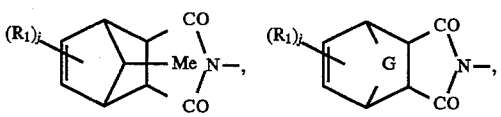

-continued

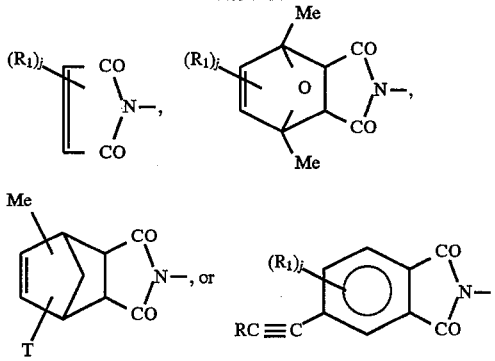

wherein

Me is Methyl;

G is —O—, —SO$_2$—, —CH$_2$—, or —S—;

T is allyl or methallyl;

R$_1$ is lower alkoxy, aryl, substituted aryl, lower alkyl, substituted alkyl, aryloxy, or halogen;

R is hydrogen, alkyl, or phenyl;

i is 1 or 2;

j is 0, 1 or 2;

Z is —NHCO—∅—A$_i$; and

β is —O—∅—NH$_2$;

(b) n moles of at least one diamine selected from the group consisting of:

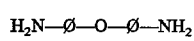

and

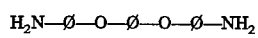

(c) n+1 moles of a mixture of at least one dianhydride of the general formula:

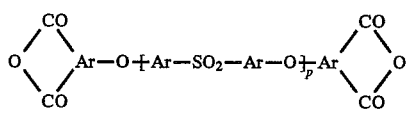

wherein

Ar is an aromatic radical; and p is a small integer greater than or equal to 1; and at least one of BTDA or

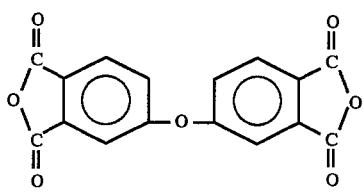

wherein n is an integer selected so that the oligomer possesses thermoplastic properties.

2. The oligomer of claim 1 wherein A is

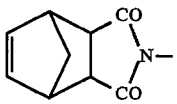

and i is 2.

3. The oligomer of claim 1 wherein A is

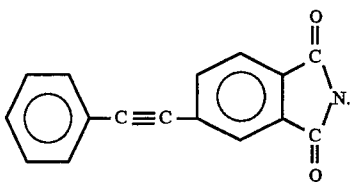

4. A blend comprising a mixture of the oligomer of claim 1 and a comparable, noncrosslinking polymer.

5. A crosslinkable polyimide oligomer having the general formula:

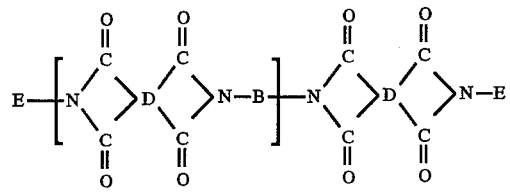

wherein E is the residue of an imidophenylamine end cap having the general formula:

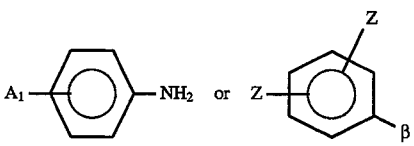

wherein A is:

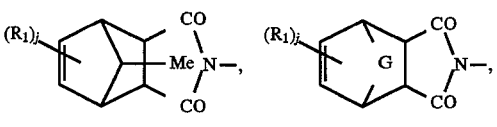

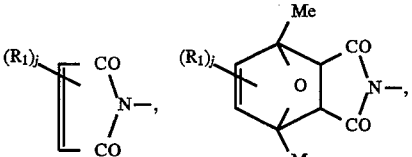

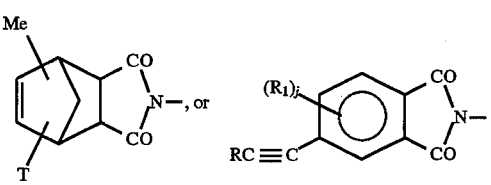

wherein

Me is Methyl;

G is —O—, —SO$_2$—, —CH$_2$—, or —S—;

T is allyl or methallyl;

R is hydrogen, alkyl, or phenyl;

Z is —NHCO—∅—$A_i$;

β is —O—∅—$NH_2$;

$R_1$ is lower alkoxy, aryl, substituted aryl, lower alkyl, substituted alkyl, aryloxy, or halogen;

i is 1 or 2; and j is 0, 1 or 2;

D is the residue of a dianhydride, at least some of the residues having the general formula:

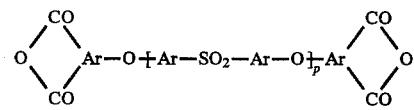

wherein

Ar is an aromatic radical, and p is a small integer greater than or equal to 1; and B is the residue of a diamine, at least some of the residues being formed from:

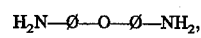

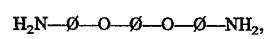

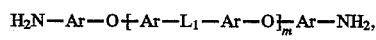

or

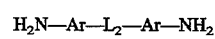

wherein

Ar is an aromatic radical;

$L_1$ is a linkage selected from the group consisting of —$SO_2$—, —S—, —CO—, —$(CF_3)_2C$—, —O— and —$(CH_3)_2C$—;

$L_2$ is a linkage selected from the group consisting of —$SO_2$—, —O—, —S—, and —$CH_2$—;

m is a small integer greater than or equal to 1; and n is a small integer greater than or equal to 1.

6. The oligomer of claim 5 wherein A is

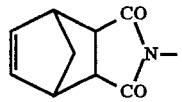

and i is 2.

7. The oligomer of claim 5 wherein A is

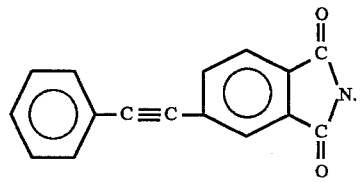

8. A blend comprising a mixture of the oligomer of claim 5 and a comparable, noncrosslinking polymer prepared from the diamine and the dianhydride of the oligomer.

9. A prepreg comprising the oligomer of claim 1 and a reinforcing additive in fiber or particulate form.

10. A prepreg comprising the oligomer of claim 5 and a reinforcing additive in fiber or particulate form.

11. A multidimensional, crosslinkable, polyimide oligomer having the general formula:

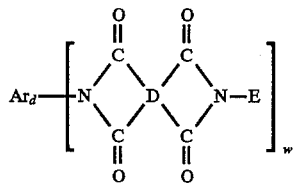

wherein $Ar_d$ is an organic moiety; and w is 2, 3 or 4;

D is the residue of: BTDA;

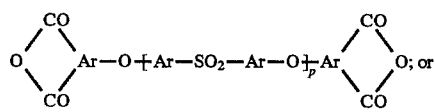

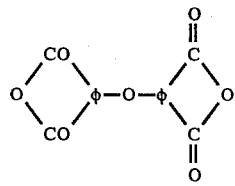

wherein

Ar is an aromatic radical, and p is a small integer greater than or equal to 1; and E is the residue of an imidophenylamine end cap having the general formula:

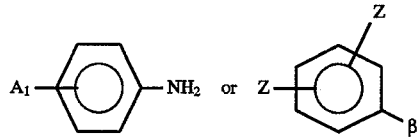

wherein A is:

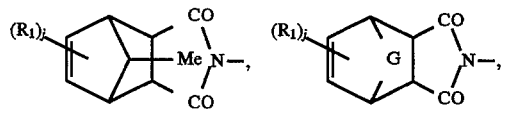

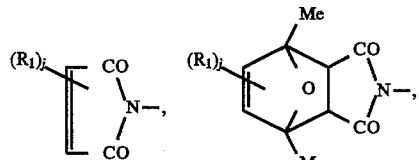

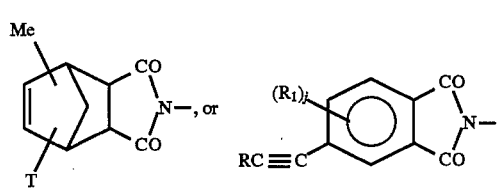

wherein

R is hydrogen, alkyl, or phenyl;
Me is Methyl;
G is —O—, —SO₂—, —CH₂—, or —S—;
T is allyl or methallyl;
R₁ is lower alkoxy, aryl, substituted aryl, lower alkyl, substituted alkyl, aryloxy, or halogen;
i is 1 or 2;
j is 0, 1 or 2;
Z is —NCHO—Ø—Aᵢ; and
β is —O—Ø—NH₂.

12. A prepreg comprising the oligomer of claim 11 and a reinforcing additive in fiber or particulate form.
13. A composite comprising a cured oligomer of claim 1.
14. A composite comprising a cured oligomer of claim 5.
15. A composite comprising a cured oligomer of claim 11.
16. A crosslinkable polyimide oligomer having the general formula:

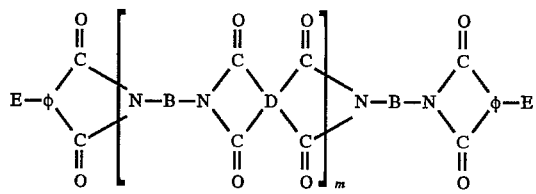

wherein
E is —O—Ø—ₖ or —O—Ø—Aᵢ
i is 1 or 2;
k is 1 or 2;
A is

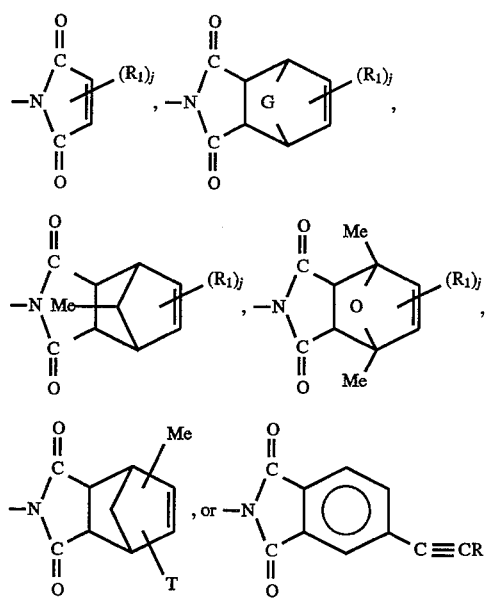

R is hydrogen, alkyl, or phenyl;
Me is methyl;
G is —O—, —SO₂—, —CH₂—, or —S—;
T is allyl or methallyl;
R₁ is lower alkoxy, aryl, substituted aryl, lower alkyl, substituted alkyl, aryloxy, or halogen;

j is 0, 1, or 2;
B is the residue of a diamine;
D is the residue of a dianhydride
wherein at least some of B or D have the formula:

so that the oligomer remains relatively soluble in conventional processing solvents.

17. The oligomer of claim 16 wherein A is:

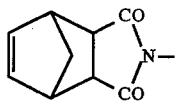

and i is 2.

18. The oligomer of claim 16 wherein A is

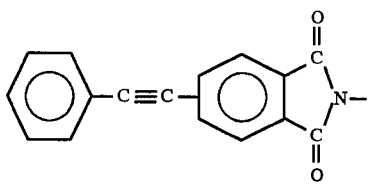

19. A phenylethynyl-terminated polyimide oligomer of the formula:

$$E_i\text{—}\xi\text{—}E_i$$

wherein
i is 1 or 2;
E is

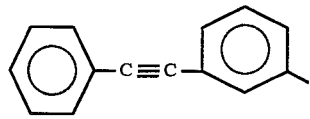

and

ξ is a polyimide backbone containing condensed diamine and dianhydride residues, at least one of the diamine or dianhydride having a residue selected from the group consisting of:

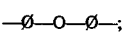;

and

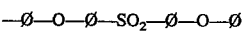

wherein Ø is phenylene.
20. The oligomer of claim 19 wherein i is 2.

* * * * *